Nov. 6, 1956 — H. E. ALTGELT — 2,769,383
TWO-WAY PLOW WITH DRAFT TRANSMITTING LATCH
Filed June 29, 1953 — 3 Sheets-Sheet 1

INVENTOR.
HERMAN E. ALTGELT
BY
ATTORNEYS

Nov. 6, 1956 H. E. ALTGELT 2,769,383
TWO-WAY PLOW WITH DRAFT TRANSMITTING LATCH
Filed June 29, 1953 3 Sheets-Sheet 3

INVENTOR.
HERMAN E. ALTGELT
ATTORNEYS

United States Patent Office 2,769,383
Patented Nov. 6, 1956

2,769,383

TWO-WAY PLOW WITH DRAFT TRANSMITTING LATCH

Herman E. Altgelt, Moline, Ill., assignor to Deere & Company, Moline, Ill., a corporation of Illinois Application June 29, 1953, Serial No. 364,787

13 Claims. (Cl. 97—24.5)

The present invention relates generally to agricultural implements and more particularly to two-way plows, which are implements of the type normally having right- and left-hand plow bottoms that are reversibly mounted, so that when the outfit travels in one direction, the right-hand bottom or bottoms are turned downwardly to operating position, so as to throw the furrow slice in one direction, and then when the end of the row is reached, the plow bottoms are reversed so that upon traversing the field in the other direction, the left-hand plow bottoms are lowered into operating position, and therefore throwing the furrow slice in the same direction relative to the land. More particularly, the present invention relates to two-way plows of the type in which the right- and left-hand plow bottoms are carried upon a rotatable plow frame that is mounted on or within a main frame for movement relative thereto about a transverse axis. One advantage of this type of implement is that the plows may be reversed merely by disconnecting the plow frame from the main frame and, without stopping the outfit, permitting the plowing unit to rotate about said axis until the other plow bottoms are in plowing position, whereupon the restraining or latch means can be reengaged with the plow frame and lock the latter with the desired plow bottoms in operating position.

The object and general nature of the present invention is the provision of suitable controlling latch mechanism so constructed and arranged that the draft pull, transmitted between the tractor and the plow, can be transmitted directly through the holding or latch means to the plow frame, thus eliminating a relatively heavy and unwieldy main frame, since the latter is relieved of at least the major portion of the draft forces involved, which are relatively great in such operations as plowing with two or more plow bottoms in operation at the same time.

It is a further feature of this invention to provide a two-way plow of the type referred to above, in which the draft pull is transmitted to the plow frame directly through controlling latch mechanism which, although transmitting the relatively heavy draft forces, is easy to manipulate, whereby a simple hand latch may be employed for releasing one set of plows and permitting the other set to be rotated into plowing position, as by the continued forward travel of the outfit.

These and other objects and advantages of the present invention will be apparent to those skilled in the art after a consideration of the following detailed description, taken in conjunction with the accompanying drawings, in which:

Figure 6 is an enlarged fragmentary view of certain details of the rockable connection between the reversible implement frame and the main frame.

Figure 7 is a sectional view taken along the line 7—7 of Figure 6.

Figure 1:
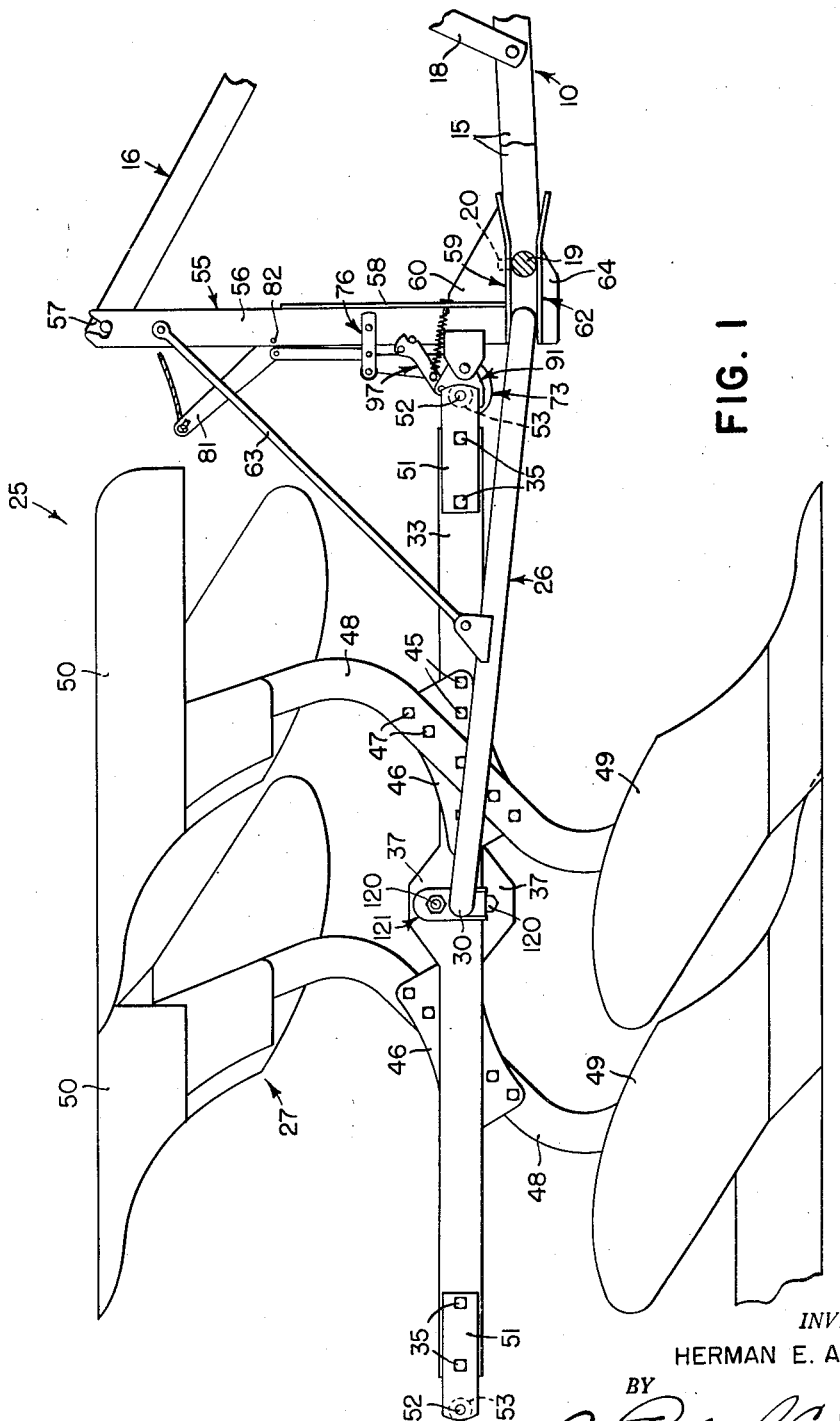
Fig. 1 is a side view of a two-way plow in which the principles of the present invention have been incorporated.
Figure 2:
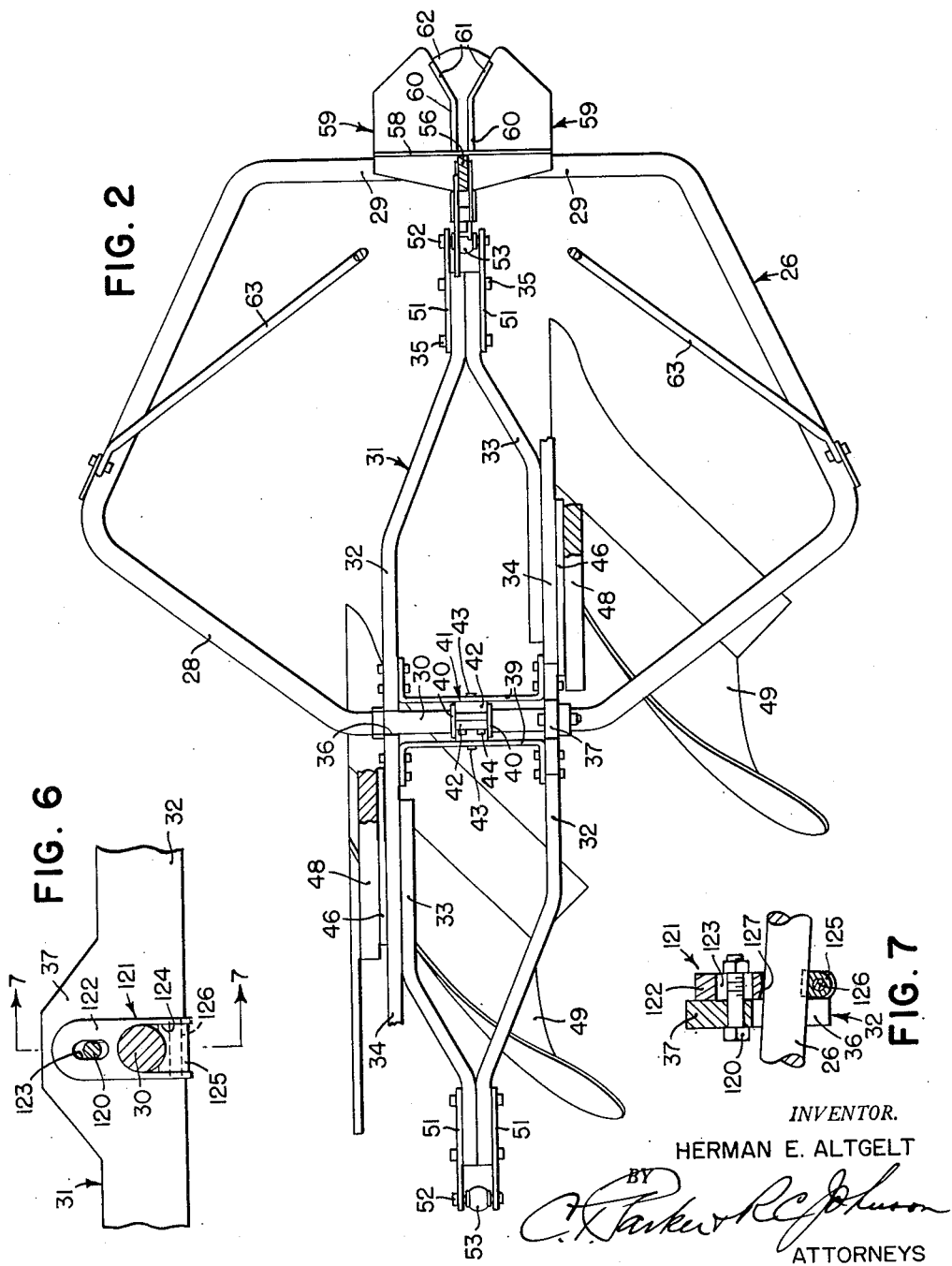
Fig. 2 is a plan view of the two-way plow shown in Fig. 1, with certain portions of the hitch mechanism omitted, for purposes of clarity.

Referring now to the drawings, more particularly Figs. 1 and 2, the plow of the present invention is adapted to be attached to a tractor 10 of the type that includes a generally vertically swingable drawbar or bail member 15 and an upper generally V-shaped compression member or link 16 swingably connected at its front end with the tractor, as through lift arms (not shown), the rear ends of which are connected through link means 18 with the vertically swingable drawbar 15. The latter member includes a rear transverse bar 19 in the central portion of which is an upstanding attaching pin 20 particularly adapted to serve implements that are attachable to the tractor 10. It will be understood that the present invention is not particularly concerned with the details of the hitch means by which the implement is connected with the tractor, and the implement of the present invention is, generally speaking, attachable to any suitable farm tractor.

The implement in which the principles of the present invention are concerned is indicated at 25 and is shown as a two-way two-bottom moldboard plow connectible in draft-receiving relation with the hitch links 15 and 16 of the tractor. The implement 25 includes a main frame 26 and an implement unit 27 of the reversible type mounted for rotation about a generally transverse axis on said main frame 26. The latter is made up of a generally U-shaped bar 28, preferably of round stock. The end portions 29 of the U-shaped bar 28 are disposed forwardly and are suitably connected together. The rear or bight portion 30 of the U-shaped bar 28 extends transversely and serves as a bearing section swingably receiving a rockably mounted reversible frame unit 31 that is made up of suitably shaped pairs of frame bars 32 and 33 bolted together and so constructed and arranged that, at the front and rear ends of the frame 31, the bars 32 and 33 converge and are brought into contact and provided with aligned apertures to receive bolts 35 that secure the bars together. Midway of the ends of the frame 31, the generally central portion of the bars 32 are notched, as at 36, to receive the bight portion 30 of the main frame 26 with provision for some relative vertical movement so as to provide for tilting of the main frame 26 with respect to the tractor when the latter operates with one wheel in a previously opened furrow. Suitable means described below provides for adjusting or determining the angular relation between the plow frame 31 and the main frame 26. Each of the notched portions 36 is reenforced by a block 37 or the like welded to the frame bar adjacent to and generally in the vertical plane of the notch 36. The frame 31 is assembled with one of the notches 36 extending downwardly while the other notch 36 extends upwardly. The central portions of the frame bars 32, at opposite sides of the frame 31, are interconnected by a pair of U-shaped cross members 39, the ends of which are turned laterally and secured, as by bolts, to the frame bars 32. The bars 39 not only reenforce the plow frame but in addition provide for pivotally receiving a trunnion member 41 that pivotally connects the frames 26 and 31 for movement one relative to the other about both transverse and fore-and-aft extending axes. The frame bars 32 are extended, as at 34, to receive colters (not shown).

The rear or bight portion 30 of the main frame 26 has a pair of laterally spaced apart collars 40 welded thereto, and disposed on this portion of the main frame bar between the collars 40 is the bearing trunnion 41, which comprises two identical mating sections 42. Each section 42 has a trunnion 43 rockably disposed in a centrally disposed opening formed in the associated crossbar 39 of the plow frame 31.

The plow frame bars 33 and 34 are also apertured at a plurality of points to receive bolts 45 that connect the plow standard plates or brackets 46 to the plow frame. Connected, as by bolts 47, to each bracket 46 is a plow standard 48 shaped at its ends to receive right- and left-hand plow bottoms 49 and 50. A pair of roller support straps 51 are connected to each end of the plow frame, preferably by the same bolts 35 that extend through the aligned apertures in the outer ends of the frame bars 32 and 33 mentioned above and which rigidly interconnect the end portions of the plow frame bars. The outer ends of each pair of roller support straps 51 are apertured to receive a shaft 52 on which a latching roller 53 is rotatably mounted.

The main frame 26 also includes a mast section 55 which is made up of a vertical bar 56 notched at its upper end, as at 57, and securely fixed, as by welding, to the front end portions 29 of the U-shaped bar 28. A transverse gusset plate 58 is securely fixed to the forward edge of the bar 56, as by welding, and at its lower end the gusset plate 58 is welded to the upper side of an upper generally horizontal attaching plate 59, these parts being reenforced by fore-and-aft extending, vertically disposed plate sections 60, the forward portions 61 of which are disposed in diverging relation while the rear portions thereof are spaced apart laterally to receive therebetween the attaching pin 20 of the tractor drawbar member 19. Cooperating with the generally horizontal attaching member 59 is a lower generally horizontal attaching member 62 spaced below the upper attaching plate 59 by an amount at least equal to the diameter of the crossbar 19 of the tractor drawbar. The lower plate member 62 is reenforced by a pair of vertical fore-and-aft extending bracket plates 64 welded to the plate 62. The forward or lip portions of the upper and lower plates 59 and 62 diverge forwardly, to facilitate backing the tractor drawbar into position therebetween. Suitable means (not shown) is employed for releasably holding the drawbar member 19 in position between the plate 59 and 62. The latter, therefore, serve as socket means releasably receiving the tractor drawbar in draft-transmitting relation. Due to the relatively wide contact or engagement of the plates 59 and 62 with the tractor drawbar member 19, the tractor serves to laterally stabilize the plow main frame 26. The upper end of the mast bar 56 is braced by rods 63 to the side portions of the associated main frame bar 28 and 29, as best shown in Figs. 1 and 2.

According to the principles of the present invention, either end of the plow frame may be latched in draft-transmitting relation to the forwardmost portion of the main frame, which is the part that is substantially directly connected to the tractor drawbar 15. Preferably, also, such draft-transmitting means is also so constructed and arranged as to be released, so as to permit the plow frame to turn about its transverse axis relative to the main frame so as to reverse the plow bottoms, and when the plow frame has been turned through substantially 180° the other end of the frame is automatically latched in draft-transmitting relation to the main frame 26. This latch construction will now be described.

Figure 3:
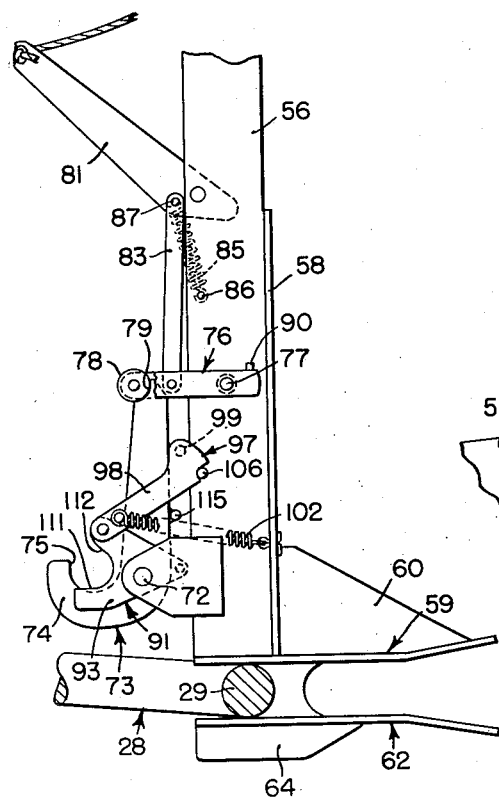
Fig. 3 is a fragmentary side view, at an enlarged scale, showing the details of the draft-transmitting latch mechanism.

A pair of bracket plates 71 are fixed to opposite sides of the lower portion of the mast bar 56, and these plates are apertured to receive a pivot pin 72 on which the main draft-transmitting member 73 is pivoted. The member 73 constitutes a draft hook having its lower portion 74 shaped to receive and embrace either of the rollers 53. As best shown in Fig. 3, a portion 75 of the draft hook member 73 lies above the center of the ball or roller 53 seated therein. Thus, not only may the draft be transmitted from the mast section of the main frame directly to the plow frame through the draft hook member but, in addition, as long as the draft hook member 73 is held against pivotal movement, there is no tendency for the associated ball or roller 53 to disengage itself from the hook member. As will best be seen from Fig. 1, the reaction of the soil against the plow bottoms, being below the axis of pivoting of the plow frame relative to the main frame, produces a couple that tends to keep the roller engaged in the draft hook member 73.

A draft hook retaining member 76 is pivoted, as at 77, on the mast bar 56 and at its rear end pivotally supports a roller 78 that is adapted to seat in a notch 79 formed in the upper end of the shank of the draft hook 73. The hook retaining member 76 is controlled by a hand lever 81 pivoted at 82 to the mast bar 51 and connected by a link 83 with the member 76. The link 83 is pivoted at its upper and lower ends to the hand lever 81 and the member 76, respectively. A spring 85 is connected to a pin 86 on the mast bar 51 and, at its upper end, to the pivot 87 that connects the upper end of the link 83 with the hand lever 81. The spring 85 is a tension spring and normally urges the link 83 to move downwardly, thus biasing the member 76 to engage over and lock the latch or draft hook 73 in its draft-transmitting position. A stop 90 on the mast limits the downward movement of the retaining member 76. The forward edge of the upper end of the draft hook 73 is beveled, as at 88, so as to facilitate reengagement of the member 76 with the upper end of the draft-transmitting hook member 73.

According to the principles of the present invention, means is provided for positively retaining the plow frame abutment ball or roller 53 in draft-transmitting relation within the hook section of the member 73. Such means will now be described.

Figure 5:
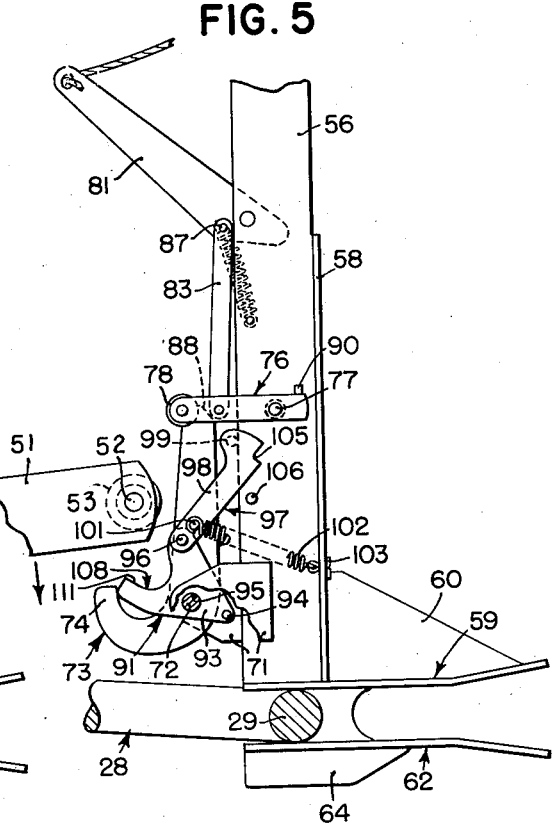
Fig. 5 is a view similar to Fig. 3 showing the retaining mechanism of the latch construction in a released position, with the front end of the plowing unit approaching its latched and draft-receiving position.
Figure 4:
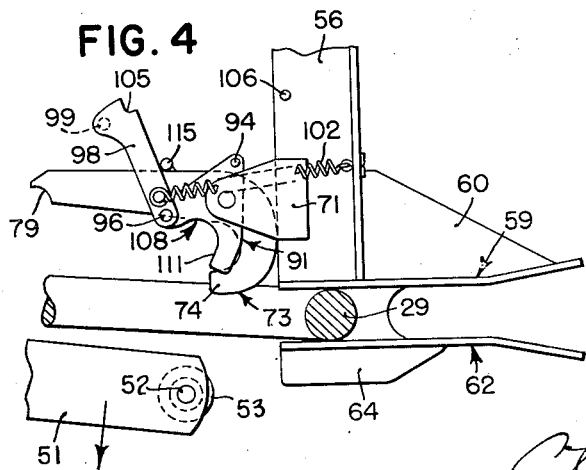
Fig. 4 is a view similar to Fig. 3, showing the position of the latch parts after the control cable has been pulled to release the plowing unit for the purpose of permitting the latter to roll over into a position of reversed plowing.

Referring now to Fig. 3, the plow frame abutment retaining member is indicated at 91 and is pivotally mounted on the bracket plates 71 by the pivot member 72 that pivotally connects the draft hook member 73 to the bracket plates 71. The retaining member 91 comprises a pair of generally triangular plates 93 rigidly interconnected adjacent their forward portions by a crossbar 94 (Figure 4) secured, as by welding, to the plates 93. The latter are apertured, as at 95, to receive the pivot member 72, and at their upper portions the plates 93 are provided with laterally outwardly extending pivot studs 96 to which a locking member 97 is swingably connected. The member 97 comprises a pair of bars 98 rigidly interconnected by a pin 99 the ends of which are secured, as by welding, to the links or bars 98. One end of the pin 99 lies against the forward edge of the mast bar 56 when the latch parts are disposed in the positions shown in Figure 5. One of the bars 98 carries a laterally outwardly extending stud 101 that receives one end of a spring 102, the other end of which is connected by a fastener 103 to the adjacent portion of the mast gusset plate 58. The forward ends of the locking member bars 98 are provided with recesses 105 that are adapted to lockingly engage the ends of a pin 106 that is carried by the adjacent portion of the mast bar 56. The abutment-retaining member 19 has the rear portions of the plates 93 shaped, as at 108, to provide a roller or ball-receiving socket with a first portion 111 that lies generally below the ball or roller 53 and another portion 112 that lies generally above the member 53, as shown in Figure 3.

The operation of the device of the present invention as so far described is substantially as follows.

The normal operating position of the plow and associated mechanism is shown in Fig. 1, wherein it will be seen that the abutment ball or roller 53 is seated in the socket or hook section of the member 73 and that the upper end of the latter member is securely locked to the mast bar 56 by the retaining arm 76. Normally, the reaction of the soil against the plow frame tends to cause the roller or abutment ball 53 to bear downwardly against the bottom of the socket in the draft-transmitting hook member 73, and at the same time the forward movement of the propelling tractor exerts a direct pull against the member 53 in a generally fore-and-aft direction, thereby pulling the plows through the ground in their plowing positions. The roller holding member 91 is locked in its holding position, as shown in Figures 1 and 3, with the upper portion 112 overlying the roller or abutment member 53, the member 91 being latched in this position by the front end of the bars 98 seating over the retaining pin 106. In this position, it will be noted that the spring 102 is under tension and serves to hold the bars 98 in their locking position.

When it is desired to reverse the plows, all that it is necessary to do is to pull upwardly and forwardly on the hand lever 81. It is not necessary at this point to raise the plow out of the ground, although this is generally done since the reversing of the plows is performed only at the end of the field where it is necessary to turn the outfit about. Pulling up on the hand lever 81 lifts the link 83, and the latter immediately raises the retaining roller 78 out of engagement with the upper end of the draft hook member 73. The latter immediately pivots downwardly about the pivot 72 since the point of contact between the ball or roller 53 and the hook section 74 lies rearwardly of the pivot 72. The hook member 73 carries a short pin 115, and in the rearward movement of the upper portion of the member 73, the pin comes into engagement with the bars 98 and moves the upper ends of the latter out of engagement with the retaining pin 106. As soon as the hook member 73 is released from the restraining latch 76, the hook member 73 and the retaining member 91 swing downwardly and rearwardly into the position shown in Fig. 4 and the front end of the plow swings downwardly into the position shown in Fig. 4 under the reaction of the soil pressure thereagainst. As soon as the front end of the plow becomes fully disengaged from the hook member 72 and the retaining member 91, the tension spring 102 immediately swings these parts back into a position to be reengaged by the locking member 76, the parts occupying the positions shown in Fig. 5 as the other end of the plow frame, now the front end after the plow has rolled over through 180°, approaches the latching mechanism. In completing the relatching of the plow, it will be noted that the roller 53 first engages the lower portion 111 of the retaining member 91, and as the plow continues to roll over the member 91 is swung in a counterclockwise direction, against the tension of the spring 102, and during this action, the pin 99 serves as a guide for the part 97 and slides along the rear edge of the mast bar 56 until the counterclockwise movement of the member 91 and the action of the spring 102 cause the notches 105 at front ends of the bars 98 to reengage the pin 106, at which time the abutment member 53 becomes securely locked in draft-transmitting relation to the mast bar 56 at the front end of the main frame.

It will be seen from the above description that the plow-retaining latch structure serves to transmit draft directly to the front end of the plow frame in either operating position of the latter. One of the principal advantages of transmitting draft directly from the front end of the main frame to the front end of the plow frame is that the remainder of the main frame is not subjected to draft forces and therefore can be of much lighter construction than would otherwise be the case.

As mentioned above, the plane of the main frame 26 lies at an acute angle with respect to the vertical plane containing the plow standards 39. This arrangement provides for the tilting of the tractor relative to a vertical plane when the tractor is operated, as is normal, with one rear wheel in the previously formed furrow. With the arrangement as shown, the reversal of the plows from right-hand plowing to left-hand plowing automatically accommodates the relative reversal of the tilting of the tractor, which occurs when the tractor is changed from one position, with the right-hand rear wheel in a previously opened furrow, to the other position in which the left-hand wheel operates in a previously formed furrow.

The angle of the plow standard relative to the generally horizontal plane of the main frame may be adjusted by the means shown in Figs. 6 and 7. Secured, as by a bolt 120, to the central or notched portion of each frame bar 32 is a leveling member 121. The latter includes a yoke 122 that is slotted, as at 123, to receive the associated fastening bolt 120, the yoke 122 also being bifurcated, as at 124, to receive a pivot block 125 that is swively mounted on a pin 126 carried by the bifurcated section 124. The pivot block and yoke are so formed that the transverse portion 30 of the main frame bar 26 is snugly but rotatably and rockably received in the yokes 122. By loosening the bolts 120 and shifting the yokes 122 generally vertically, one being shifted upwardly and the other being shifted downwardly, a greater or lesser amount of tilt of the plow frame relative to the plow standard may be provided. The intermediate portion of each yoke member is so shaped, as at 127, to accommodate rocking of the aessociated frame bar therein. Experience has shown that provision for a maximum amount of tilt of about 10° will accommodate substantially all plowing depths.

While I have shown and described above the preferred structure in which the principles of the present invention have been incorporated, it is to be understood that my invention is not to be limited to the particular details, shown and described above but that, in fact, widely different means may be employed in the practice of the broader aspects of my invention.

What I claim, therefore, and desire to secure by Letters Patent is:

1. A two-way plow comprising a main frame, a set of right- and left-hand plows including a plow frame rotatably mounted in said main frame about a generally transverse axis, a draft-transmitting hook member pivotally carried by said main frame and adapted in one position to engage the plow frame in draft-transmitting relation, said hook member being rotatable out of said one position so as to accommodate movement of said plow frame beyond said hook member through an extent sufficient to bring another portion of said frame into a position to engage said hook member, and means to hold said plow frame in said hook member, including a first retaining member engageable with the plow frame, and a retaining part pivoted to said retaining member and releasably engaged with said main frame, said first retaining member being movable about the pivot axis of said hook member.

2. A two-way plow comprising a main frame, a set of right- and left-hand plows including a plow frame rotatably mounted in said main frame about a generally transverse axis, a draft-transmitting hook member pivotally carried by said main frame and adapted in one position to engage the plow frame in draft-transmitting relation, latch means carried by said main frame for releasably holding said hook member in frame-engaging relation, a second latch means carried by said main frame and disposed in a position to engage the forward portion of the plow frame and hold the latter in engagement with said hook member, and means on said hook member for releasing said second latch means when said first latch means releases the hook member.

3. A latch construction for two-way plows and the like, wherein a plow frame is rotatable into two positions relative to a main frame, said latch construction comprising a plow frame engaging hook member constructed to transmit draft to said plow frame, means for pivotally connecting said hook member with the main frame, a manually controlled latch adapted to be pivoted to said main frame and engageable with said hook member for holding the latter against rotation, means also adapted to be mounted on the main frame for releasably holding the plow frame in engagement with said hook member, and means responsive to movement of said hook member when the latter is manually released for moving said holding means out of frame-holding position.

4. The invention set forth in claim 3, further characterized by said holding means comprising a pair of plate members pivoted for movement about the same axis as said hook member and shaped to provide a socket for receiving a portion of the plow frame, and said holding means also including a spring-biased detent connected with said plates and reacting against the main frame for releasably holding the plow frame locked to said hook member.

5. In a latch construction, a main frame, a hook member pivoted thereto, means on the main frame to releasably lock the hook member in one position, a retaining member pivotally connected with the hook member, a retaining part pivoted to said retaining member and releasably connected with said main frame, and spring means acting between said retaining part and said main frame for urging the retaining part into connection with said main frame.

6. In a latch construction, a main frame, a hook member pivoted thereto, means on the main frame to releasably lock the hook member in one position, a retaining member pivotally connected with the main frame, a retaining part pivoted to said retaining member and releasably connected with said main frame, and means responsive to movement of the hook member away from its locked position for releasing the retaining part from said main frame.

7. A latch construction as defined in claim 6, further characterized by means responsive to movement of the retaining member in one direction relative to the main frame for reengaging the retaining part with said main frame.

8. A two-way plow comprising a main frame, a set of right- and left-hand plows including a plow frame rotatably mounted in said main frame about a generally transverse axis, a draft-transmitting hook member pivotally carried by said main frame and adapted in one position to engage the plow frame in draft-transmitting relation, latch means carried by said main frame for releasably holding said hook member in frame-engaging relation, means to hold said plow frame in said hook member, including a first retaining member engageable with the plow frame and a retaining part pivoted to said retaining member and releasably engaged with said main frame, and means responsive to releasing movement of said hook member for releasing said retaining part from the main frame.

9. In a latch construction, a main frame, a hook member pivoted thereto, means on the main frame to releasably lock the hook member in one position, a retaining member pivotally connected with the main frame in a position adjacent said hook to cooperate therewith, a retaining part pivoted to said retaining member and releasably connected with said main frame, abutment means interposed between the retaining part and said hook, and spring means connected between said retaining part and said main frame and acting through said retaining part and said abutment means to return said hook member into engagement with said first mentioned means.

10. The invention set forth in claim 9, further characterized by guide means on the retaining part, and means on the main frame to releasably receive said retaining part.

11. A two-way plow comprising the combination of a main frame, a set of right- and left-hand plows including a plow frame rotatably mounted on said main frame about a generally transverse axis, and draft-transmitting means carried by the forward part of said main frame and releasably engageable with the forward portion of said plow frame in either position of the latter in said main frame, said draft-transmitting means including hook means having a portion which is releasably engageable behind a generally vertically disposed surface on the forward portion of the plow frame for transmitting draft pull to the latter.

12. A two-way plow comprising the combination of a main frame, a set of right- and left-hand plows including a generally fore-and-aft extending plow frame rotatably mounted on said main frame about a generally transverse axis, a draft-receiving abutment on each end of said plow frame having a generally vertically disposed surface, a draft-transmitting hook member carried by said main frame in a position to releasably engage behind the vertically disposed surface on the associated forwardly disposed abutment for transmitting draft pull to the plow frame, said hook member being movable into a position out of the path of movement of the associated abutment, means connected with said hook member for moving the latter to release the associated abutment member, and resilient means acting between said main frame and said hook member to move the latter back into a position to releasably engage behind the vertically disposed surface on the associated abutment so as to transmit draft to the forward end of the plow frame.

13. A two-way plow comprising the combination of a main frame, a set of right- and left-hand plows including a plow frame rotatably mounted on said main frame about a generally transverse axis, draft-transmitting means carried by the forward part of said main frame and releasably engageable with said plow frame in either position of the latter in said main frame, comprising a hook member pivoted to said frame and having a frame engaging part adapted to engage said frame and limit movement thereof when the plow frame approaches said part from one direction, said hook member having a portion which is releasably engageable behind a vertically disposed surface on the main frame so as to transmit draft to the latter at the front end thereof, said hook member being swingable through an extent sufficient to carry said part away from the frame so as to permit the latter to resume rotary movement in said one direction, resilient means acting between said hook member and said main frame to shift said frame engaging part back into the path of movement of said part, and means connected with said main frame to releasably hold said hook member connected thereto.

References Cited in the file of this patent
UNITED STATES PATENTS

| | | |
|---|---|---|
| 1,793,242 | Neufang | Feb. 17, 1931 |
| 2,129,745 | Scammell et al. | Sept. 13, 1938 |
| 2,582,478 | Carlson | Jan. 15, 1952 |